US011845414B2

(12) United States Patent
Ding et al.

(10) Patent No.: US 11,845,414 B2
(45) Date of Patent: Dec. 19, 2023

(54) EMERGENCY BRAKING EXTENSION DEVICE FOR URBAN RAIL VEHICLE (71) Applicant: CRRC Nanjing Puzhen Co., Ltd., Nanjing (CN)

(72) Inventors: Chaofeng Ding, Nanjing (CN); Fengli Zhang, Nanjing (CN); Rujun Liang, Nanjing (CN); Chunmeng Wang, Nanjing (CN); Xiaofang Shi, Nanjing (CN); Aiping Zhang, Nanjing (CN); Lian Ge, Nanjing (CN); Hemin Ding, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 715 days.

(21) Appl. No.: 17/047,388

(22) PCT Filed: Dec. 5, 2019

(86) PCT No.: PCT/CN2019/123204
§ 371 (c)(1),
(2) Date: Oct. 13, 2020

(87) PCT Pub. No.: WO2021/097935
PCT Pub. Date: May 27, 2021

(65) Prior Publication Data
US 2023/0331211 A1 Oct. 19, 2023

(30) Foreign Application Priority Data
Nov. 18, 2019 (CN) .......................... 201911125131.1

(51) Int. Cl.
*B60T 17/22* (2006.01)
*B60L 5/14* (2006.01)

(52) U.S. Cl.
CPC .............. *B60T 17/228* (2013.01); *B60L 5/14* (2013.01); *B60T 17/221* (2013.01)

(58) Field of Classification Search
CPC .... B60T 17/228; B60T 17/221; B60T 13/665; B60T 8/1705; B60T 2270/406;
(Continued)

(56) References Cited

U.S. PATENT DOCUMENTS

| 4,694,125 A * | 9/1987 | Takei | ........................ B60L 3/04 |
| | | | 191/87 |
| 4,745,997 A * | 5/1988 | Takei | ........................ B60L 5/14 |
| | | | 191/8 |
| 11,708,056 B2 * | 7/2023 | Dai | ........................ B61H 13/20 |
| | | | 188/144 |

FOREIGN PATENT DOCUMENTS

| CN | 201816588 U | 5/2011 |
| CN | 203005413 U | 6/2013 |

(Continued)

*Primary Examiner* — Zachary L Kuhfuss
(74) *Attorney, Agent, or Firm* — Bayramoglu Law Offices LLC (57) ABSTRACT An emergency braking extension device includes an emergency braking extension loop, a first emergency braking extension train line and a second emergency braking extension train line. The emergency braking extension loop has a protective circuit breaker, a normally open contact of an emergency braking button, and an emergency braking extension relay, which are sequentially connected in series. A normally open contact of the emergency braking extension relay is connected in series to a pantograph lowering control loop. A first normally closed contact and a second normally closed contact of the emergency braking extension relay are connected in series to a return line and a power supply negative loop of a train emergency braking control loop, respectively. A third normally closed contact of the emergency braking extension relay is connected in series to a
(Continued)

control loop of a bypass cut-off circuit of a train emergency braking execution loop.

7 Claims, 3 Drawing Sheets

(58) Field of Classification Search
CPC ........ B60T 15/027; B60T 15/021; B60L 5/14; B60L 5/19
USPC ............................................ 188/144; 303/15
See application file for complete search history.

(56) References Cited

FOREIGN PATENT DOCUMENTS

| | | |
|---|---|---|
| CN | 203268028 U | 11/2013 |
| CN | 203391776 U | 1/2014 |
| CN | 107235041 A | 10/2017 |
| CN | 107867280 A | 4/2018 |
| KR | 20120121116 A | 11/2012 |

\* cited by examiner

FIG. 5

EMERGENCY BRAKING EXTENSION DEVICE FOR URBAN RAIL VEHICLE

CROSS REFERENCE TO THE RELATED APPLICATIONS

This application is the national phase entry of International Application No. PCT/CN2019/123204, filed on Dec. 5, 2019, which is based upon and claims priority to Chinese Patent Application No. 201911125131.1, filed on Nov. 18, 2019, the entire contents of which are incorporated herein by reference.

TECHNICAL FIELD

The present invention relates to the technical field of urban rail vehicle control, and more particularly, to an emergency braking extension device for urban rail vehicles.

BACKGROUND

An emergency brake system is a system that is designed to stop a train as quickly as possible in an emergency situation, it is one of the most important systems for train safety protection. The emergency brake system typically includes a control portion and execution portion for emergency braking. The control portion is realized by the train control system (including manual control). The execution portion is generally completed by the train air brake (or hydraulic brake, magnetic track brake and other types of systems or systems that combine several types of brakes).

At present, emergency braking systems for urban rail vehicles (after being coupled) come into two different types: non-extended control and extended control. In the non-extended control system, each vehicle maintains its own control after being coupled, and completes the emergency braking control independently without being affected by the coupling. The application and relief of emergency braking only depend on the conditions of the vehicle itself. In the extended control system, the emergency braking control circuits of all coupled vehicles are connected in series to form a control circuit to control the coupled vehicles simultaneously. The application and relief of emergency braking systems are both affected by the conditions of the coupled vehicles.

All relevant conditions of the train are typically added to the emergency braking control circuit of the urban rail vehicles to form a loop. When any condition in the loop is not met, the loop is disconnected, and the train control circuit will issue an emergency braking command.

In the non-extended control system, the vehicles, after being coupled, maintain their own control loop completely independently of each other. On the basis of the original train control loop, in the extended control system, the emergency braking control loops of the coupled vehicles are automatically connected in series to form a control circuit through the control of relays and other equipment to uniformly control the coupled vehicles.

Existing emergency braking control circuits have two types of problems depending on whether the extended control system is adopted or not when the vehicles are coupled. The first type of problems are associated with non-extension, and the second type of problems are associated with extension.

In the case of non-extension, when manual emergency braking is required due to an emergency during coupled operation, the emergency braking cannot be applied synchronously between the coupled vehicles. The emergency braking can only be manually notified through intercoms between the vehicles and applied by the crew. The emergency braking applied in this way cannot be synchronized, resulting in a time difference in the emergency braking application between the vehicles. Consequently, a large pulling force is generated between the couplers, which may cause damage to the equipment. When emergency braking is manually applied to a faulty vehicle, the pantograph of a normal vehicle may not be lowered in time. As a result, a failure in the front catenary may cause the pantograph and catenary system to malfunction.

In the case of extension, a failure in the emergency braking control loop of a faulty vehicle will cause the emergency braking loop formed after the coupling to fail, and the coupled vehicles cannot relieve emergency braking. Even if the emergency braking control loop of the faulty vehicle is bypassed to make the emergency braking control of the coupled vehicles not extended, emergency braking can be applied to only the non-faulty vehicle when required. As a result, a large pulling force is generated on the couplers, causing equipment damage.

SUMMARY

In order to solve the above-mentioned problems existing in the prior art, an objective of the present invention is to provide an emergency braking extension device for urban rail vehicles, aiming to solve the problem associated with asynchronous application of emergency caused by the non-extension of emergency braking control in the prior art that results damage to couplers and equipment, and makes the pantograph unable to be lowered in time resulting in the expansion of a pantograph and catenary system failure, as well as the problem that a fault may be expanded since the emergency braking control loops of the vehicles are connected in series, and the emergency braking of a non-faulty vehicle may cause damage to the couplers and equipment.

In order to solve the above-mentioned technical problems, the present invention provides an emergency braking extension device for urban rail vehicles. The emergency braking extension device includes an emergency braking extension loop that is connected to a train power line and is located in a lead vehicle, and a first emergency braking extension train line A and a second emergency braking extension train line B that run through the urban rail vehicles. The emergency braking extension loop has a protective circuit breaker EMPBCB, a diode D01, a normally open contact EMPB-1 of an emergency braking button, and an emergency braking extension relay EMPBR, which are sequentially connected in series. The first emergency braking extension train line A is connected between the diode D01 and the normally open contact EMPB-1 of the emergency braking button. The second emergency braking extension train line B is connected between the normally open contact EMPB-1 of the emergency braking button and the emergency braking extension relay EMPBR. A train pantograph control loop is additionally provided with a pantograph lowering control loop. A normally open contact EMPBR-4 of the emergency braking extension relay is connected in series to the pantograph lowering control loop. A first normally closed contact EMPBR-1 and a second normally closed contact EMPBR-2 of the emergency braking extension relay are connected in series to a return line L3 and a power supply negative loop L8 of a train emergency braking control loop, respectively. A third normally closed contact EMPBR-3 of the emergency braking extension relay is connected in series to a control loop of a bypass cut-off circuit of a train emergency braking execution loop. An emergency braking execution train line L1 is provided in the emergency braking execution loop. Emergency braking contactors EBK1 and EBK2 are connected in series in the power supply negative loop L8. Normally open contacts EBK1-1 and EBK2-1 of the emergency braking contactors and the bypass cut-off circuit are connected in parallel, and then connected between a train power supply and the emergency braking execution train line L1.

The present invention solves the following two problems:
1. The inability to synchronously apply the emergency braking to different vehicles of urban rail vehicles if the vehicles are being coupled together for rescue or other needs.
2. The uniformed disabling of the emergency braking control loops of all vehicles that are coupled together if there is any failure of one vehicle that causes the emergency braking control loops of other non-faulty vehicles to malfunction.

The emergency braking extension loop is automatically connected through a connector between fully automatic couplers after the vehicles are coupled together. When any emergency braking button is pressed and is in an emergency braking application position, the normally open contact of the button changes to a "closed" position, and the emergency braking extension relay is powered on through the emergency braking extension loop, so that the normally closed contact of the emergency braking extension relay is disconnected. In this way, the emergency braking control loop of each vehicle and the control loop of the bypass cut-off circuit of the emergency braking control loop are disconnected. The vehicles synchronously issue an emergency braking application command, the emergency braking execution loop is powered off, and the vehicles execute emergency braking. When the emergency braking button is in the emergency braking application position, the three normally closed contacts of the button are in an open position, so that the emergency braking control loop of the vehicle where the button is in the application position and the control loop of the bypass cut-off circuit of the emergency braking control loop are disconnected to ensure that the vehicle issues an emergency braking application command, the emergency braking execution loop is powered off, and the vehicle executes emergency braking. Meanwhile, the emergency braking extension relay is powered on, and its normally open contact is closed, so that the pantograph lowering control loop is powered on, a pantograph lowering command is issued to instruct all coupled vehicles to lower their pantographs.

REFERENCE NUMERALS IN THE FIGURES

Tc: Trailer with cab; Mp: Motor vehicle with pantograph; M: Motor vehicle without pantograph; EMPBCB: Emergency braking extension circuit breaker; EMPBR: Emergency braking extension relay; EMIBR-1: First normally closed contact of emergency braking extension relay; EMPBR-2: Second normally closed contact of emergency braking extension relay; EMPBR-3: Third normally closed contact of emergency braking extension relay; EMPBR-4: Normally open contact of emergency braking extension relay; EMPB: Emergency braking button; FMPB-1: Normally open contact of emergency braking button; EMPB-2: First normally closed contact of emergency braking button; EMPB-3: Second normally closed contact of emergency braking button; EBTLCB: Emergency braking execution train line circuit breaker; EBK1: First emergency braking contactor; EBK1-1: Normally open contact of first emergency braking contactor; EBK2: Second emergency braking contactor; EBK2-1: Normally open contact of second emergency braking contactor; BBK: Emergency braking bypass contactor; BBK-1: First normally open contact of emergency braking bypass contactor; BBK-2: Second normally open contact of emergency braking bypass contactor; EBR: Emergency braking relay; BBS: Emergency braking bypass switch; PANTCB: Pantograph control power supply circuit breaker; PCS-1: Normally open contact of rear pantograph lowering control switch; PCS-2: Normally open contact of rear pantograph raising control switch; PCS-3: Normally open contact of front pantograph lowering control switch; PCS-4: Normally open contact of front pantograph raising control switch; COR-1: Second normally open contact of cab activation relay; COR-2: Normally closed contact of cab activation relay; COR-3: Third normally open contact of cab activation relay; COR-4: First normally open contact of cab activation relay; D01-D05: Diode; A: First emergency braking extension train line; B: Second emergency braking extension train line; L1: Emergency braking execution train line; L2: Outgoing line of emergency braking train loop line; L3: Return line of emergency braking train loop line; L4: Front pantograph raising train line; L5: Front pantograph lowering train line; L6: Rear pantograph raising train line; L7: Rear pantograph lowering train line; L8: Power supply negative loop; PRO-1: Emergency braking extension command transmission line; PRO-2: Emergency braking extension command transmission line; PRO-3: Emergency braking execution signal transmission line; PNE-1: Emergency braking execution command transmission line; PNE-2: Emergency braking execution command transmission line; PNE-3: Emergency braking execution command transmission line; PNT-4: Emergency braking execution command transmission line; and TCMS-1: Emergency braking execution command network monitoring signal line.

DETAILED DESCRIPTION OF THE EMBODIMENTS

Hereinafter, the device of the present invention is described by taking a 6-vehicle (Tc+Mp+M+Mp+M+Tc) subway train as an example with reference to the drawings. Tc represents a trailer with a cab, Mp represents a motor vehicle with a pantograph, and M represents a motor vehicle without pantograph. Each motor vehicle has a traction inverter, and all vehicles are each provided with a braking control unit.

Figure 1:
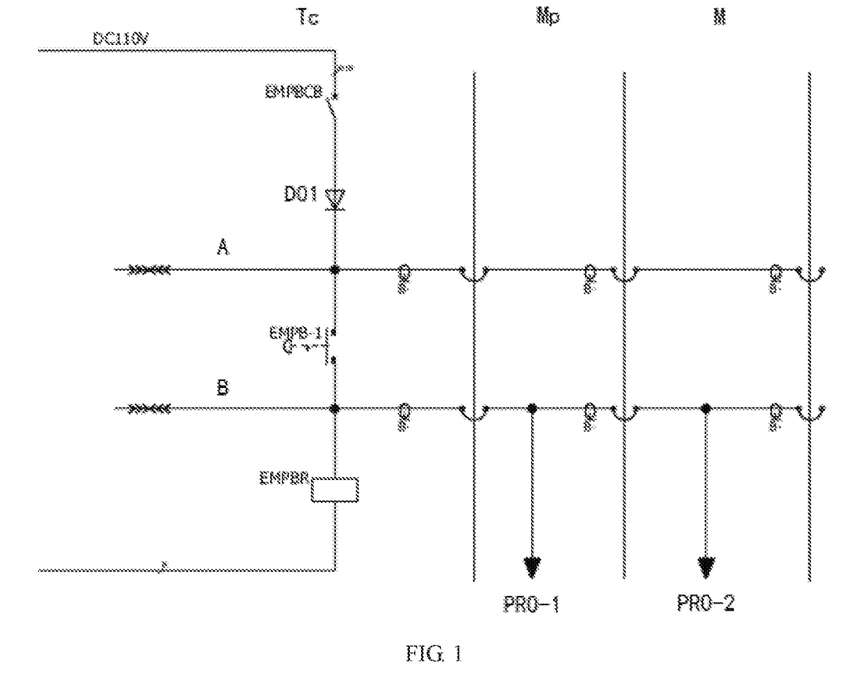
FIG. 1 is a circuit diagram of an emergency braking extension loop of the present invention.

As shown in FIGS. 1 to 5, an emergency braking extension device for urban rail vehicles includes an emergency braking extension loop that is connected to a train power line and additionally provided in a lead vehicle of the train, and the first emergency braking extension train line A and the second emergency braking extension train line B that run through the vehicles. The protective circuit breaker EMPBCB and the emergency braking extension relay EMPBR connected to the protective circuit breaker EMPBCB are additionally provided in an electrical cabinet in a cab. The protective circuit breaker EMPBCB, the diode D01, the normally open contact EMPB-1 of the emergency braking button EMPB on a driver's console and the emergency braking extension relay EMPBR are connected in series to form the emergency braking extension loop. The first emergency braking extension train line A is connected between the diode D01 and the normally open contact EMPB-1 of the emergency braking button, and the second emergency braking extension train line B is connected between the normally open contact EMPB-1 of the emergency braking button and the emergency braking extension relay EMPBR. The first emergency braking extension train lines A of two vehicles are connected by a coupler, and the second emergency braking extension train lines B of the two vehicles are also connected by a coupler. In this way, when the vehicles are coupled together, the first emergency braking extension train lines A of all vehicles are powered on; and when the normally open contact EMPB-1 of any emergency braking button is closed, the second emergency braking extension train lines B of all vehicles are powered on. In this way, the emergency braking extension relays EMPBR of all vehicles are powered on, so that the emergency braking control on multiple coupled vehicles can be implemented through one cab. The train pantograph control loop is additionally provided with a pantograph lowering control loop, and the normally open contact EMPBR-4 of the emergency braking extension relay is connected in series to the pantograph lowering control loop. The first normally closed contact EMIBR-1 and the second normally closed contact EMPBR-2 of the emergency braking extension relay are respectively connected in series to the return line L3 and the power supply negative loop L8 of a train emergency braking control loop. The third normally closed contact EMPBR-3 of the emergency braking extension relay is connected in series to a control loop of a bypass cut-off circuit of a train emergency braking execution loop. As shown in FIG. 1, the first emergency braking signal input ports of traction inverters of the vehicles Mp and M are connected to the second emergency braking extension train line B through the emergency braking extension command transmission lines PRO-1 and PRO-2 to obtain an emergency braking extension command, so as to disconnect the main circuit protection device of the vehicle.

Figure 5:
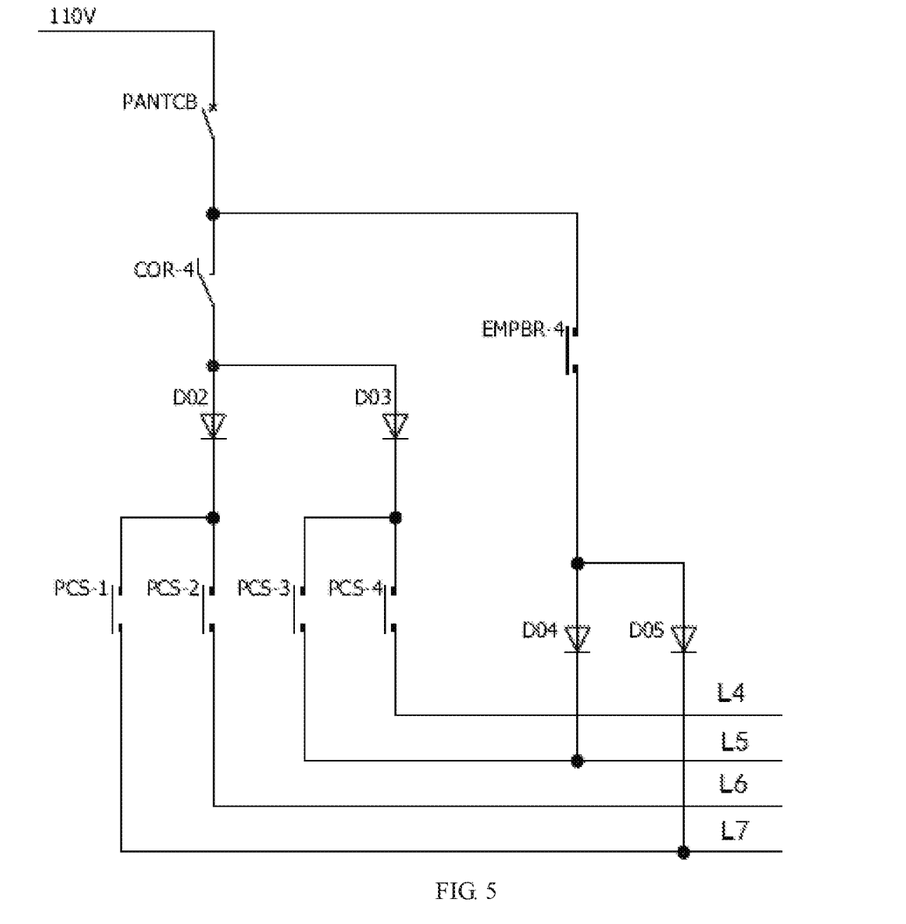
FIG. 5 is a circuit diagram of a pantograph control loop of the present invention.

As shown in FIG. 5, the pantograph control loop includes the normally open contact PCS-4 of a front pantograph raising control switch, which is connected to the front pantograph raising train line L4, and the normally open contact PCS-2 of a rear pantograph raising control switch, which is connected to the rear pantograph raising train line L6, as well as the normally open contact PCS-3 of a front pantograph lowering control switch, which is connected to the front pantograph lowering train line L5, and the normally open contact PCS-1 of a rear pantograph lowering control switch, which is connected to the rear pantograph lowering train line L7. The normally open contact PCS-2 of the rear pantograph raising control switch and the normally open contact PCS-1 of the rear pantograph lowering control switch are connected to a train power supply through the diode D02, the first normally open contact COR-4 of a cab activation relay, and the pantograph control power supply circuit breaker PANTCB. The normally open contact PCS-4 of the front pantograph raising control switch and the normally open contact PCS-3 of the front pantograph lowering control switch are connected to the train power supply through the diode D03, the first normally open contact COR-4 of the cab activation relay, and the pantograph control power supply circuit breaker PANTCB. The pantograph lowering control loop includes the normally open contact EMPBR-4 of the emergency braking extension relay and the diodes D04 and D05 that are connected in series between the pantograph control power supply circuit breaker PANTCB and the front pantograph lowering train line L5 or the rear pantograph lowering train line L7.

Figure 3:
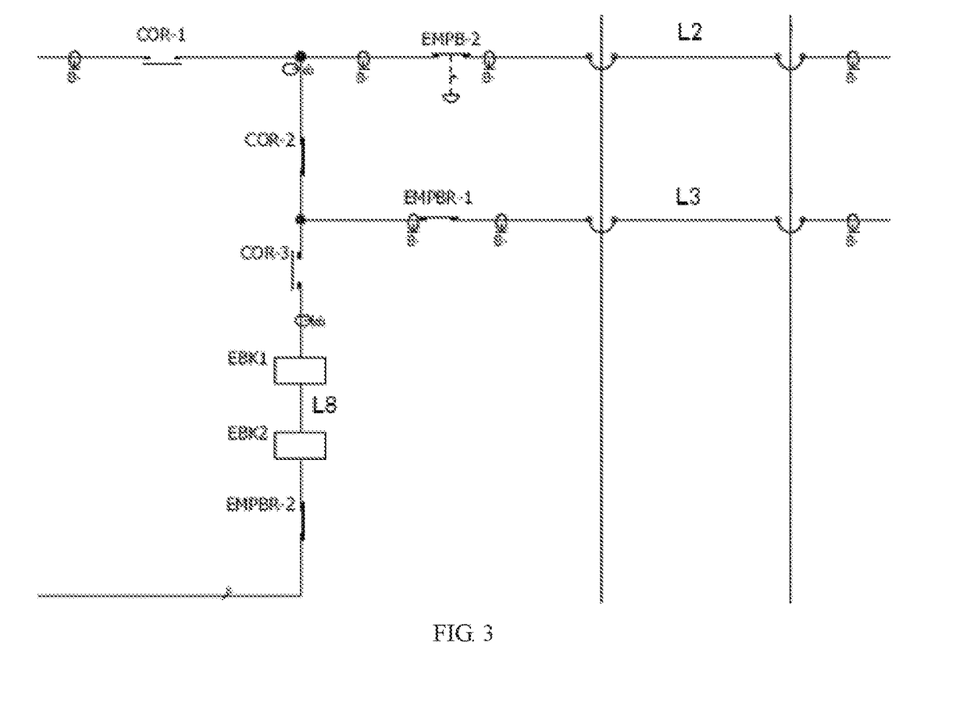
FIG. 3 is a circuit diagram of an emergency braking control loop of the present invention.

As shown in FIG. 3, the emergency braking control loop includes the outgoing line L2 of an emergency braking train loop line, the return line L3 of the emergency braking train loop line, and the power supply negative loop L8. The second normally open contact COR-1 of the cab activation relay and the first normally closed contact EMPB-2 of the emergency braking button are connected in series between the train power supply and the outgoing line L2. The power supply negative loop L8 includes the first normally closed contact EMPBR-1 of the emergency braking extension relay EMPBR, the third normally open contact COR-3 of the cab activation relay, the first emergency braking contactor EBK1, the second emergency braking contactor EBK2 and the second normally closed contact EMPBR-2 of the emergency braking extension relay EMPBR, which are sequentially connected in series with the return line L3. The line between the first normally closed contact EMPBR-1 of the emergency braking extension relay and the third normally open contact COR-3 of the cab activation relay is connected to the second normally open contact COR-1 of the cab activation relay through the normally closed contact COR-2 of the cab activation relay.

Figure 2:
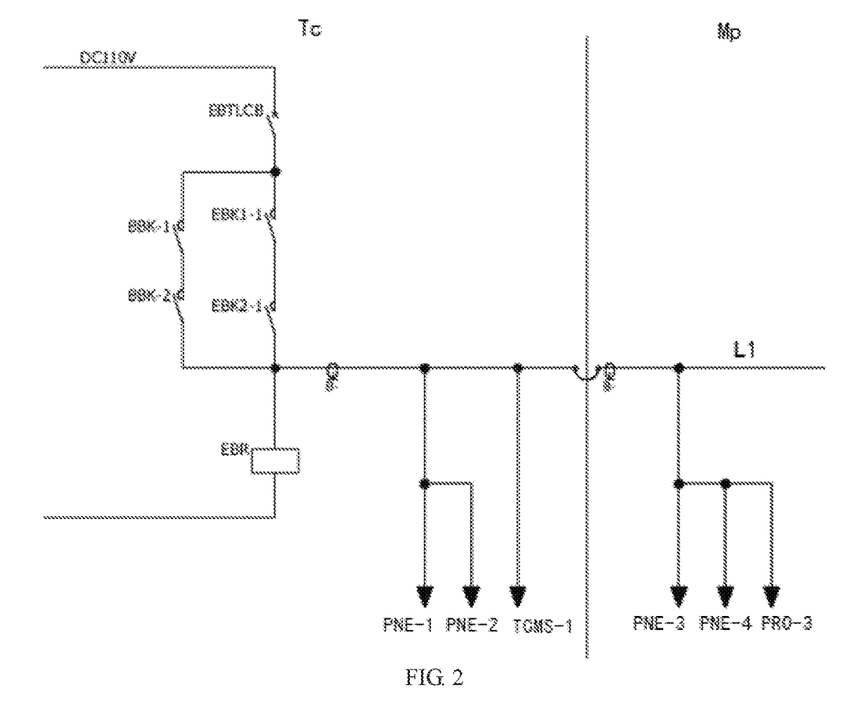
FIG. 2 is a circuit diagram of an emergency braking execution loop of the present invention.
Figure 4:
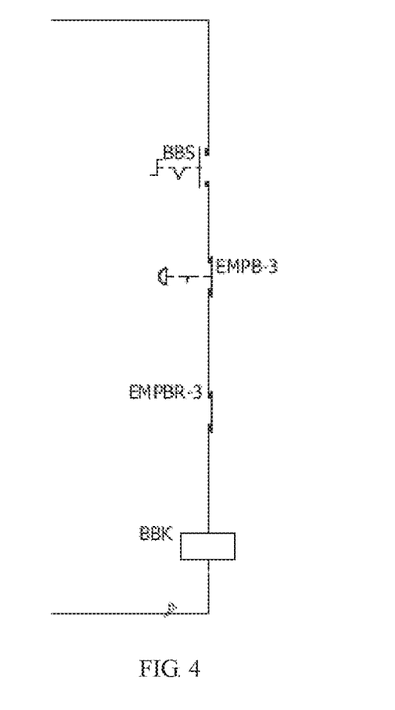
FIG. 4 is a circuit diagram of a control loop of a bypass cut-off circuit of the emergency braking execution loop of the present invention.

As shown in FIG. 2, the emergency braking execution loop includes the emergency braking execution train line circuit breaker EBTLCB, the normally open contact EBK1-1 of the first emergency braking contactor, the normally open contact EBK2-1 of the second emergency braking contactor and the emergency braking relay EBR, which are sequentially connected in series with the train power supply. The emergency braking execution train line L1 is connected between the emergency braking relay EBR and the normally open contact EBK2-1 of the second emergency braking contactor. When the emergency braking execution train line L1 is powered on, the vehicle relieves the emergency braking. At this time, the emergency braking relay EBR is powered on, and an indication signal of emergency braking is issued to the vehicle system. The bypass cut-off circuit of the emergency braking execution loop includes the first normally open contact BBK-1 and the second normally open contact BBK-2 of an emergency braking bypass contactor that is connected in parallel across the normally open contact EBK1-1 of the first emergency braking contactor and the normally open contact EBK2-1 of the second emergency braking contactor. The braking control unit that is provided in each vehicle is connected to the emergency braking execution train line L1 through the emergency braking execution command transmission lines PNE-1, PNE-2/PNE-3, and PNE-4 to obtain an emergency braking execution command to apply emergency braking. The emergency braking execution train line L1 is connected to a train network through the emergency braking execution command network monitoring signal line TCMS-1 for fault recording, fault analysis, and fault handling. A second emergency braking signal input port of the traction inverter of each motor vehicle is connected to the emergency braking execution train line L1 through the emergency braking execution signal transmission line PRO-3 to obtain an emergency braking execution command to disconnect the main circuit protection device of the vehicle. As shown in FIG. 4, the control loop of the bypass cut-off circuit of the emergency braking execution loop includes the emergency braking bypass switch BBS, the second normally closed contact EMPB-3 of the emergency braking button, the third normally closed contact EMPBR-3 of the emergency braking extension relay, and the emergency braking bypass contactor BBK, which are sequentially connected in series with the train power supply. When the control circuit shown in FIG. 3 fails to disable the emergency braking relief, the emergency braking execution train line (L1) and the emergency braking relay EBR in FIG. 2 can be powered on by closing the emergency braking bypass switch BBS.

In the present embodiment, the emergency braking button EMPB is specifically a YSK2283 bistable self-locking mushroom button. The emergency braking extension relay EMPBR is an FD670-H4V-XUUZ six-contact emergency braking extension relay. In the present invention, the emergency braking button EMPB (YSK2283 bistable self-locking mushroom button) has the characteristic of executing $5 \times 10^4$ actions. The contacts are made of silver-palladium alloy, and the rated current of the contacts is 110VDC/1A. The FD670-H4V-XUUZ six-contact emergency braking extension relay adopts a double-break contact structure, and has the characteristic of executing $1 \times 10^6$ electrical actions. The surface of the contact is gold-plated, adopting a fully enclosed gas arc extinguishing structure.

Assuming that the cab on a local side is activated, the cab activation relay on the local side is powered on.

When the emergency braking button EMPB that activates the cab is not pressed, the normally open contact EMPB-1 of the emergency braking button in FIG. 1 is disconnected, the emergency braking extension is not powered on, and the emergency braking extension relay EMPBR of each vehicle is not powered on. The normally open contact EMPBR-4 of the emergency braking extension relay and the pantograph lowering control loop in FIG. 5 are disconnected. The first normally open contact COR-4 of the cab activation relay is in a closed state, and a driver can raise and lower the pantograph normally by operating the pantograph raising and lowering switches (PCS-1, PCS-2, PCS-3, PCS-4) on the driver's console. The second normally open contact COR-1 of the cab activation relay is closed, the normally closed contact COR-2 of the cab activation relay is open, and the third normally open contact COR-3 of the cab activation relay is closed. As shown in FIG. 3, when the emergency braking button EMPB is not pressed, the first normally closed contact EMPB-2 of the emergency braking button is in a closed state. The first normally closed contact EMPBR-1 and the second normally closed contact EMPBR-2 of the emergency braking extension relay are both in a closed state. The train power supply goes to an opposite vehicle through the outgoing line L2 of the emergency braking train loop line, and then returns to the return line L3 of the emergency braking train loop line, thereby supplying power to the power supply negative loop. In this way, the first emergency braking contactor EBK1 and the second emergency braking contactor EBK2 are powered on. The normally open contact EBK1-1 of the first emergency braking contactor and the normally open contact EBK2-1 of the second emergency braking contactor in FIG. 2 are closed, so that the emergency braking execution train line L1 is powered on, and the emergency braking is not applied. As shown in FIG. 4, when the emergency braking bypass switch is activated, the normally open contact of the emergency braking bypass switch is in a closed position. When the emergency braking button EMPB that activates the cab is not pressed, the second normally closed contact EMPB-3 of the emergency braking button and the third normally closed contact EMPBR-3 of the emergency braking extension relay are both in a closed state, so that the control loop of the bypass cut-off circuit of the emergency braking execution loop is powered on (that is, the emergency braking bypass contactor BBK is powered on). In this way, the first normally open contact BBK-1 and the second normally open contact BBK-2 of the emergency braking bypass contactor in FIG. 2 are closed, and the bypass cut-off circuit of the emergency braking execution loop is powered on. This ensures that the emergency braking execution train line L1 is powered on, the relay EBR is in a powered-on state, and the emergency braking is in a relief state.

When the emergency braking button EMPB that activates the cab is pressed, the normally open contact EMPB-1 of the emergency braking button in FIG. 1 is closed, the emergency braking extension relay EMPBR is powered on, and an emergency braking application command is transmitted to the emergency braking extension loop and the traction inverter of each vehicle. As shown in FIG. 5, the normally open contact EMPBR-4 of the emergency braking extension relay is closed, and the pantograph lowering control loop in the train pantograph control loop is powered on. Then, the front pantograph lowering train line L5 and the rear pantograph lowering train line L7 are powered on to perform the operations of lowering the front and rear pantographs. Meanwhile, the first normally closed contact EMPB-2 of the emergency braking button in FIG. 3 is disconnected, cutting off power to the outgoing line L2. Since the normally closed contact COR-2 of the cab activation relay is in a disconnected state, the power supply negative loop L8 is not powered on. In addition, the first normally closed contact EMPB-2 of the emergency braking button is in a disconnected state to ensure that the first emergency braking contactor EBK1 and the second emergency braking contactor EBK2 are not powered on. In this way, the normally open contact EBK1-1 of the first emergency braking contactor and the normally open contact EBK2-1 of the second emergency braking contactor in FIG. 2 are disconnected. As shown in FIG. 4, when the emergency braking button EMPB that activates the cab is pressed, the second normally closed contact EMPB-3 of the emergency braking button and the third normally closed contact EMPBR-3 of the emergency braking extension relay are both in a disconnected state, so that the control loop of the bypass cut-off circuit of the emergency braking execution loop is powered off (that is, the emergency braking bypass contactor BBK is powered off). Accordingly, the first normally open contact BBK-1 and the second normally open contact BBK-2 of the emergency braking bypass contactor in FIG. 2 are disconnected. In this way, the emergency braking execution train line L1 in FIG. 2 is powered off, emergency braking is applied, and the emergency braking relay EBR issues an indication signal of emergency braking.

After the vehicles are coupled together, the expansion of train failure caused by a failure of the emergency braking control loop of a faulty vehicle can be avoided. If manual emergency braking is required due to an emergency, the emergency braking button EMPB on any driver's console can be directly pressed to the application position. In this way, the emergency braking extension relay EMPBR is powered on, the normally open contact of the emergency braking extension relay EMPBR is closed, and the normally closed contact of the emergency braking extension relay EMPBR is disconnected. Accordingly, the pantograph lowering control loop is closed, the emergency braking control loop and the emergency braking bypass cut-off loop are disconnected, so that the emergency braking execution loop is powered off, thereby signaling all of the vehicles to apply emergency braking synchronously, and avoiding damage to the coupler due to a large pulling force.

The present invention may have other implementations in addition to those embodiments described above. All technical solutions obtained by equivalent replacements or equivalent transformations shall fall within the scope of protection of the present invention.

What is claimed is:

1. An emergency braking extension device for urban rail vehicles, comprising:
    an emergency braking extension loop,
    a first emergency braking extension train line, and
    a second emergency braking extension train line;
    wherein
    the emergency braking extension loop is connected to a train power line and located in a lead vehicle of the urban rail vehicles;
    the first emergency braking extension train line and the second emergency braking extension train line run through the urban rail vehicles;
    wherein the emergency braking extension loop has a protective circuit breaker, a first diode, a normally open contact of an emergency braking button and an emergency braking extension relay, wherein the protective circuit breaker, the first diode, the normally open contact of the emergency braking button and the emergency braking extension relay are sequentially connected in series;
    the first emergency braking extension train line is connected between the first diode and the normally open contact of the emergency braking button;
    the second emergency braking extension train line is connected between the normally open contact of the emergency braking button and the emergency braking extension relay;
    a train pantograph control loop is additionally provided with a pantograph lowering control loop;
    a normally open contact of the emergency braking extension relay is connected in series to the pantograph lowering control loop;
    a first normally closed contact of the emergency braking extension relay is connected in series to a return line of a train emergency braking control loop;
    a second normally closed contact of the emergency braking extension relay is connected in series to a power supply negative loop of the train emergency braking control loop;
    a third normally closed contact of the emergency braking extension relay is connected in series to a control loop of a bypass cut-off circuit of a train emergency braking execution loop;
    an emergency braking execution train line is provided in the train emergency braking execution loop;
    a first emergency braking contactors and a second emergency braking contactor are connected in series in the power supply negative loop; and
    a normally open contact of the first emergency braking contactor, a normally open contact of the second-emergency braking contactor and the bypass cut-off circuit are connected in parallel, and then the normally open contact of the first emergency braking contactor, the normally open contact of the second emergency braking contactor and the bypass cut-off circuit are connected between a train power supply and the emergency braking execution train line.

2. The emergency braking extension device for the urban rail vehicles according to claim 1, wherein
    the protective circuit breaker is located in an electrical cabinet of a cab, and the emergency braking button is located on a console of a driver.

3. The emergency braking extension device for the urban rail vehicles according to claim 1, wherein
    the train pantograph control loop comprises a fourth normally open contact and a second normally open contact of pantograph raising control switches; wherein
    the fourth normally open contact of the pantograph raising control switches is connected to a first pantograph raising train line;
    the second normally open contact of the pantograph raising control switches is connected to a second pantograph raising train line;
    the train pantograph control loop further comprises a third normally open contact and a first normally open contact of pantograph lowering control switches; wherein
    the third normally open contacts of the pantograph lowering control switches is connected to a first pantograph lowering train lines;
    the first normally open contact of the pantograph lowering control switches is connected to a second pantograph lowering train line;
    the fourth normally open contacts and the second normally open contact of the pantograph raising control switches and the third normally open contacts the first normally open contact of the pantograph lowering control switches are connected to the train power supply through a second diode, a third diode, a first normally open contact of a cab activation relay and a pantograph control power supply circuit breaker;
    the pantograph lowering control loop comprises the normally open contact of the emergency braking extension relay, a fourth diode and a fifth diode, wherein
    the normally open contact of the emergency braking extension relay, the fourth diode and the fifth diode are connected in series between the pantograph control power supply circuit breaker and the first pantograph lowering train lines or the second pantograph lowering train line.

4. The emergency braking extension device for the urban rail vehicles according to claim 1, wherein
    the emergency braking control loop comprises an outgoing line, a return line and the power supply negative loop;
    a second normally open contact of a cab activation relay and a first normally closed contact of the emergency braking button are connected in series between the train power supply and the outgoing line;
    the power supply negative loop comprises the first normally closed contact of the emergency braking extension relay, a third normally open contact of the cab activation relay, the first emergency braking contactors, the second emergency braking contactor and the second normally closed contact of the emergency braking extension relay, wherein
    the first normally closed contact of the emergency braking extension relay, the third normally open contact of the cab activation relay, the first emergency braking contactor, the second emergency braking contactor and the second normally closed contact of the emergency braking extension relay are sequentially connected in series with the return line; and a line between the first normally closed contact of the emergency braking extension relay and the third normally open contact of the cab activation relay is connected to the second normally open contact of the cab activation relay through a normally closed contact of the cab activation relay.

5. The emergency braking extension device for the urban rail vehicles according to claim 1, wherein
the train emergency braking execution loop comprises an emergency braking execution train line circuit breaker, the normally open contacts of the first emergency braking contactor, the normally open contact of the second emergency braking contactor and an emergency braking relay, wherein
the emergency braking execution train line circuit breaker, the normally open contacts of the first emergency braking contactor, the normally open contact of the second emergency braking contactor and the emergency braking relay are sequentially connected in series with the train power supply;
the emergency braking execution train line is connected between the emergency braking relay and the normally open contacts of the first emergency braking contactor or the normally open contact of the second emergency braking contactor;
when the emergency braking execution train line is powered off, the urban rail vehicles apply an emergency braking, and the emergency braking relay is powered off,
when the emergency braking execution train line is powered on, the urban rail vehicles relieve the emergency braking, and the emergency braking relay is powered on;

the bypass cut-off circuit of the train emergency braking execution loop comprises a first normally open contacts and a second normally open contact of an emergency braking bypass contactor, wherein the first normally open contact and the second normally open contact of the emergency braking bypass contactor are connected in parallel across the normally open contacts of the first emergency braking contactors and the normally open contact of the second emergency braking contactor;
the control loop of the bypass cut-off circuit of the train emergency braking execution loop comprises an emergency braking bypass switch, the third normally closed contact of the emergency braking extension relay and the emergency braking bypass contactor, wherein
the emergency braking bypass switch, the third normally closed contact of the emergency braking extension relay and the emergency braking bypass contactor are sequentially connected in series with the train power supply.

6. The emergency braking extension device for the urban rail vehicles according to claim 1, wherein
a second normally closed contact of the emergency braking button is further connected in series in the control loop of the bypass cut-off circuit of the train emergency braking execution loop.

7. The emergency braking extension device for the urban rail vehicles according to claim 1, wherein
the first emergency braking extension train lines of two vehicles of the urban rail vehicles are connected by a first coupler, and the second emergency braking extension train lines of the two vehicles are connected by a second coupler.

* * * * *